(12) United States Patent
McNeill et al.

(10) Patent No.: US 9,249,835 B2
(45) Date of Patent: Feb. 2, 2016

(54) EXTRUDED BEARING HOUSING

(71) Applicant: Schaeffler Technologies GmbH & Co. KG, Herzogenaurach (DE)

(72) Inventors: Paul McNeill, Charlotte, NC (US); Carsten Ohr, Charlotte, NC (US); Scott Hart, Sharon, SC (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 14/337,713

(22) Filed: Jul. 22, 2014

(65) Prior Publication Data

US 2015/0030271 A1 Jan. 29, 2015

Related U.S. Application Data

(60) Provisional application No. 61/858,910, filed on Jul. 26, 2013.

(51) Int. Cl.
*F16C 27/00* (2006.01)
*F16C 35/04* (2006.01)
*F16C 27/04* (2006.01)

(52) U.S. Cl.
CPC .............. *F16C 35/042* (2013.01); *F16C 27/04* (2013.01)

(58) Field of Classification Search
CPC ........ F16C 35/02; F16C 35/04; F16C 35/042; F16C 35/067
USPC .................... 384/215, 220, 535, 536
See application file for complete search history.

(56) References Cited

U.S. PATENT DOCUMENTS

| 3,185,532 | A | * | 5/1965 | Loch ............................. 384/215 |
| 5,407,282 | A | * | 4/1995 | Bade et al. .................... 384/126 |
| 6,849,974 | B2 | * | 2/2005 | Howe et al. .................... 310/89 |
| 8,336,341 | B2 | | 12/2012 | Kim et al. |

FOREIGN PATENT DOCUMENTS

EP 1 746 192 A3 10/2009

* cited by examiner

*Primary Examiner* — Phillip A Johnson
(74) *Attorney, Agent, or Firm* — Volpe and Koenig, P.C.

(57) ABSTRACT

An extruded bearing housing is provided. The extruded bearing housing includes a radially inner ring, and a radially outer ring located concentric with the radially inner ring. The extruded bearing housing includes webs that connect the radially inner ring and the radially outer ring, and the webs are arranged at an acute angle to a circumferential direction. Openings axially extend through the bearing housing and are defined between the webs, the radially inner ring, and the radially outer ring. Adjacent ones of the webs extend in opposite directions from each other.

11 Claims, 2 Drawing Sheets

EXTRUDED BEARING HOUSING

INCORPORATION BY REFERENCE

The following documents are incorporated herein by reference as if fully set forth: U.S. Provisional Application No. 61/858,910, filed Jul. 26, 2013.

FIELD OF INVENTION

This application is generally related to a bearing housing and more particularly related to a bearing housing for use in injection molded parts.

BACKGROUND

Bearing housings are inserted into molded plastic structures that lack suitable strength for supporting bearing assemblies. The bearing housing must be able to withstand pressures exerted on the outer surface of the bearing housing during formation of an injection molded part that surrounds the bearing housing. The pressure from injection molding can deform the bearing housing, and the bearing housing then must be re-machined to restore the opening in the bearing housing so that the inner ring of the bearing housing that receives the bearing is not deformed. One known solution for ensuring that the inner ring of the bearing housing maintains its shape during forming is to use a steel or cast iron bearing housing. However, it is also desirable to use a lighter material in order to lower operating costs as well as the mass moment of inertia of the assembly. U.S. Pat. No. 8,336,341 and EP 1 746 192 both disclose bearing housings. Neither of these references disclose extruded bearing housings.

SUMMARY

It would be desirable to provide a durable, lightweight bearing housing.

An extruded bearing housing is provided. The extruded bearing housing includes a radially inner ring, and a radially outer ring located concentric with the radially inner ring. The extruded bearing housing includes webs that connect the radially inner ring and the radially outer ring, and the webs are arranged at an acute angle to a circumferential direction of the rings. Openings axially extend through the bearing housing and are defined between the webs, the radially inner ring, and the radially outer ring. Adjacent ones of the webs extend in opposite directions from each other.

An injection molded assembly is also provided. The injection molded assembly includes an extruded bearing housing having a radially inner ring, and a radially outer ring located concentric with the radially inner ring. Webs connect the radially inner ring and the radially outer ring, and are arranged at an acute angle to a circumferential direction of the rings. Openings axially extend through the bearing housing and are defined between the webs, the radially inner ring, and the radially outer ring. Adjacent ones of the webs extend in opposite directions from each other, and at least some of the openings define crush zones for deflection of at least one of the radially outer ring and the webs. The injection molded assembly includes an injection molded housing positioned around the extruded bearing housing. Pressure from forming the injection molded housing causes deflection of the at least one of the radially outer ring and the webs into the crush zones.

Preferred arrangements with one or more features of the invention are described below and in the claims.

BRIEF DESCRIPTION OF THE DRAWINGS

The foregoing Summary as well as the following Detailed Description will be best understood when read in conjunction with the appended drawings. In the drawings.

DETAILED DESCRIPTION OF THE PREFERRED EMBODIMENTS

Figure 1:
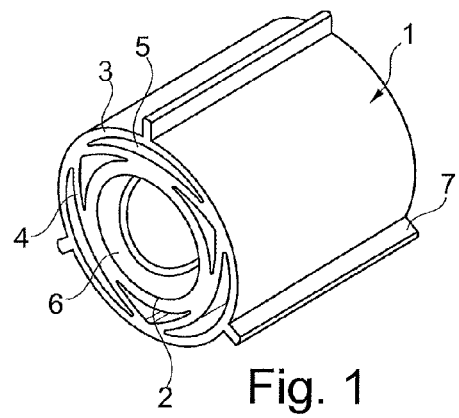
FIG. 1 is a perspective view of a first embodiment of an extruded bearing housing according to the invention.

Certain terminology is used in the following description for convenience only and is not limiting. The words "inner," "outer," "inwardly," and "outwardly" refer to directions towards and away from the parts referenced in the drawings. A reference to a list of items that are cited as "at least one of a, b, or c" (where a, b, and c represent the items being listed) means any single one of the items a, b, c or combinations thereof. The terminology includes the words specifically noted above, derivates thereof, and words of similar import.

FIG. 1 shows a preferred embodiment of the extruded bearing housing valve 1 according to the present invention. The extruded bearing housing 1 includes a radially inner ring 2, and a radially outer ring 3 located concentric with the radially inner ring 2. The extruded bearing housing 1 is preferably made of aluminum. In a preferred embodiment, the radially inner ring 2 is preferably between 8-13 mm thick, and is more preferably 10 mm thick. The radially outer ring 3 is preferably between 5-10 mm thick, and is more preferably 7.5 mm thick. One of ordinary skill in the art recognizes the thicknesses of the radially inner ring 2 and the radially outer ring 3 can be varied depending on the application.

Figure 2:
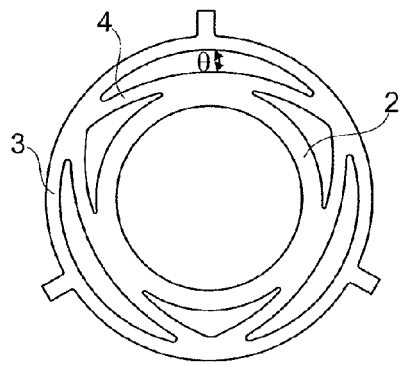
FIG. 2 shows a plan view of a second embodiment of the extruded bearing housing according to the invention.
Figure 3:
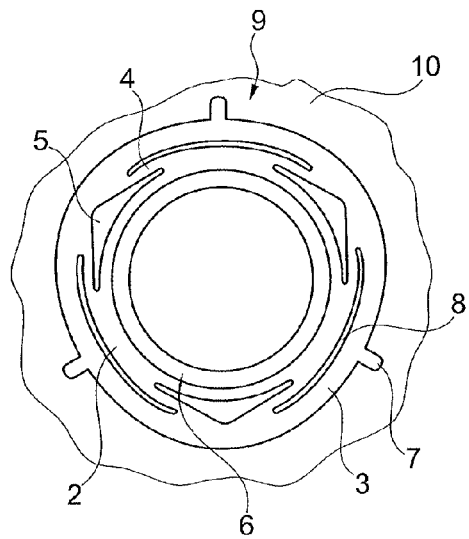
FIG. 3 shows a plan view of an injection molded assembly including the extruded bearing housing of FIG. 1.

As shown in FIGS. 1 and 3, an inner surface of the radially inner ring 2 can include a peripheral groove 6 at one or both axial ends for supporting a radially outer bearing ring (not shown). In a preferred embodiment, a peripheral groove 6 is located adjacent to an axial end face of the radially inner ring 2. In another embodiment shown in FIG. 2, the inner surface of the radially inner ring 2 does not include a peripheral groove. As shown in FIG. 3, an outer surface of the radially outer ring 3 can include a plurality of radially extending tabs 7 for engaging an outer plastic housing 10. The tabs 7 can extend along an entire axial extent of the outer surface of the radially outer ring 3. Alternatively, as shown in FIG. 4h, the outer surface of the radially outer ring 3h can include grooves 7'. The tabs 7 or grooves 7' prevent rotation of the extruded bearing housing 1. In a preferred embodiment, the outer surface of the radially outer ring 3 includes three radially extending tabs 7 that are spaced apart circumferentially, preferably equidistant from each other. However, one of ordinary skill recognizes that any number of tabs 7 or spacing can be used.

The extruded bearing housing 1 includes webs 4 that connect the radially inner ring 2 and the radially outer ring 3. Each web 4 is preferably between 4-7 mm thick, and is more preferably 5 mm thick. In the first embodiment, the webs 4 are arranged at an acute angle $\theta$ to a circumferential direction. Preferably, the acute angle $\theta$ is approximately 10-20°, and is more preferably 15°. Openings 5 axially extend through the extruded bearing housing 1 and are defined between the webs 4, the radially inner ring 2, and the radially outer ring 3. Adjacent ones of the webs 4 extend in opposite directions from each other. Adjacent ones of the openings 5 are preferably different sizes. As shown in FIG. 3, at least some of the openings 5 define crush zones 8 for deflection of at least one of the radially outer ring 3 and the webs 4. During formation of an injection molding assembly 9, an injection molded housing 10 is formed around the extruded bearing housing 1. Pressure from forming the injection molded housing 10 causes deflection of at least one of the radially outer ring 3 and the webs 4 into the crush zones 8, as shown in FIG. 3. Adjacent ones of the webs 4 extend in opposite directions from each other to provide stability to the extruded bearing housing 1 during forming of the injection molded housing 10. As formation of the injection molded housing 10 exerts a radially inward force on the radially outer ring 3, the oppositely extending webs 4 provide resistance to the radially inward force and prevent the radially inner ring 2 from deforming. The radially inner ring 2 remains undeformed despite the pressure exerted on the extruded bearing housing 1 from forming the injection molded housing 10.

Figure 4A:
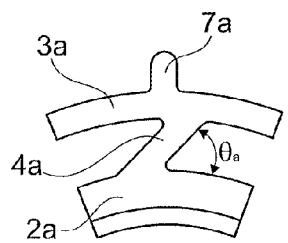
FIG. 4a is an enlarged sectional view of a preferred embodiment of the extruded bearing housing according to the invention.
Figure 4B:
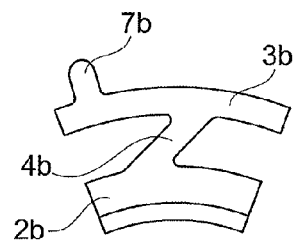
FIG. 4b is an enlarged sectional view of a preferred embodiment of the extruded bearing housing according to the invention.
Figure 4C:
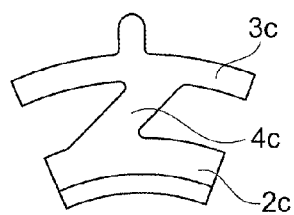
FIG. 4c is an enlarged sectional view of a preferred embodiment of the extruded bearing housing according to the invention.
Figure 4D:
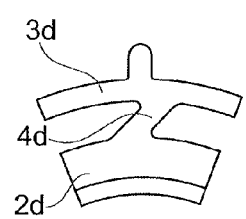
FIG. 4d is an enlarged sectional view of a preferred embodiment of the extruded bearing housing according to the invention.
Figure 4E:
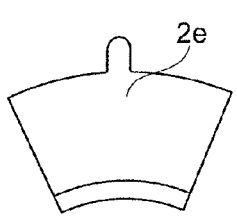
FIG. 4e is an enlarged sectional view of a preferred embodiment of the extruded bearing housing according to the invention.
Figure 4F:
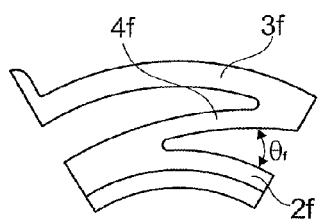
FIG. 4f is an enlarged sectional view of the first preferred embodiment of the extruded bearing housing according to the invention.
Figure 4G:
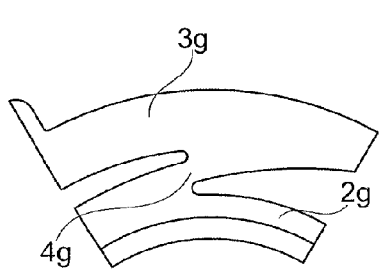
FIG. 4g is an enlarged sectional view of a preferred embodiment of the extruded bearing housing according to the invention.
Figure 4H:
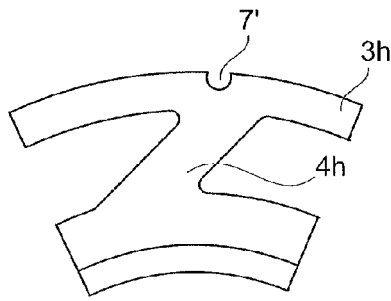
FIG. 4h is an enlarged sectional view of a preferred embodiment of the extruded bearing housing according to the invention.

FIGS. 4a-4g show enlarged views of the radially inner ring 2, radially outer ring, 3 and webs 4 for variations of the extruded bearing housing 1. In one embodiment shown in FIG. 4a, the tab 7a is located circumferentially proximal to a portion of intersection of the web 4a and the radially outer ring 3a, In this embodiment, the webs 4a are arranged at an acute angle $\theta_a$ to a circumferential direction that is approximately 40°-50°, and is more preferably 45°. In another embodiment shown in FIG. 4b, the tab 7b is located circumferentially distal from a portion of intersection of the web 4b and the radially outer ring 3b, In another embodiment shown in FIG. 4c, the web 4c has an increased thickness, and is preferably 7 mm thick. In another embodiment shown in FIG. 4d, the radially inner ring 2d has an increased thickness, and is preferably 12.5 mm thick. In another embodiment shown in FIG. 4e, the extruded bearing housing lacks any openings or webs, and comprises a single ring 2e, FIG. 4f is an enlarged view of the first embodiment of the extruded bearing housing 1. As shown in FIG. 4f, the webs 4f are arranged at an acute angle $\theta_f$ to a circumferential direction that is approximately 10°-20°, and is more preferably 15°. In another embodiment shown in FIG. 4g, the radially outer ring 3g has an increased thickness, and is preferably between 5-10 mm thick, and is more preferably between 7.5-10 mm thick.

Having thus described various embodiments of the present extruded bearing housing in detail, it is to be appreciated and will be apparent to those skilled in the art that many changes, only a few of which are exemplified in the detailed description above, could be made in the apparatus without altering the inventive concepts and principles embodied therein. The present embodiments are therefore to be considered in all respects as illustrative and not restrictive, the scope of the invention being indicated by the appended claims rather than by the foregoing description, and all changes which come within the meaning and range of equivalency of the claims are therefore to be embraced therein.

LOG TO REFERENCE NUMBERS

1 Extruded Bearing Housing
2 Radially Inner Ring
3 Radially Outer Ring
4 Webs
5 Openings
6 Peripheral Groove
7 Tabs
7' Grooves
8 Crush Zones
9 Injection Molded Assembly
10 Injection Molded Housing
$\theta$ Angle to a circumferential direction

What is claimed is:

1. An extruded bearing housing, comprising:
a radially inner ring;
a radially outer ring located concentric with the radially inner ring;
webs that connect the radially inner ring and the radially outer ring, the webs being arranged at an acute angle to a circumferential direction; and
openings axially extend through the bearing housing and are defined between the webs, the radially inner ring, and the radially outer ring, and adjacent ones of the webs extend in opposite directions from each other.

2. The extruded bearing housing of claim 1, wherein an inner surface of the radially inner ring includes at least one peripheral groove for supporting a radially outer bearing ring.

3. The extruded bearing housing of claim 1, wherein an outer surface of the radially outer ring includes a plurality of radially extending tabs or a plurality of grooves for engaging an outer plastic housing.

4. The extruded bearing housing of claim 1, wherein the bearing housing is made of aluminum.

5. The extruded bearing housing of claim 1, wherein at least some of the openings define crush zones for deflection of at least one of the radially outer ring and the webs.

6. The extruded bearing housing of claim 1, wherein the webs extend non-linearly between the radially inner ring and the radially outer ring.

7. The extruded bearing housing of claim 1, wherein an axial depth of the extruded bearing housing is greater than an inner diameter of the radially inner ring.

8. An injection molded assembly, comprising:
an extruded bearing housing including:
a radially inner ring,
a radially outer ring located concentric with the radially inner ring,
webs that connect the radially inner ring and the radially outer ring, and arranged at an acute angle to a circumferential direction, and openings that axially extend through the bearing housing and are defined between the webs, the radially inner ring, and the radially outer ring, adjacent ones of the webs extend in opposite directions from each other, and at least some of the openings define crush zones for deflection of at least one of the radially outer ring and the webs; and an injection molded housing positioned around the extruded bearing housing, wherein pressure from forming the injection molded housing causes deflection of the at least one of the radially outer ring and the webs into the crush zones.

9. The injection molded assembly of claim 8, wherein the acute angle is between 10-20°.

10. The injection molded assembly of claim 8, wherein adjacent ones of the openings are different sizes.

11. An extruded bearing housing, comprising:
a radially inner ring including a radially inner surface having a peripheral groove at an axial end of the radially inner ring;
a radially outer ring located concentric with the radially inner ring;
webs that connect the radially inner ring and the radially outer ring, the webs being arranged at an acute angle to a circumferential direction; and
openings axially extend through the bearing housing and are defined between the webs, the radially inner ring, and the radially outer ring, and adjacent ones of the webs extend in opposite directions from each other.

* * * * *